United States Patent [19]
Roch

[11] 3,820,377
[45] June 28, 1974

[54] GAUGING APPARATUS FOR PRESSES AND THE LIKE

[75] Inventor: Gerald V. Roch, Indianapolis, Ind.

[73] Assignee: Hurco Manufacturing Co., Inc., Indianapolis, Ind.

[22] Filed: Aug. 30, 1972

[21] Appl. No.: 284,895

[52] U.S. Cl............... 72/461, 72/7, 72/DIG. 21
[51] Int. Cl............................. B21d 11/22
[58] Field of Search............ 72/7, 22, 36, DIG. 21, 72/461; 83/71, 393, 207, 253, 467

[56] References Cited
UNITED STATES PATENTS

| | | | |
|---|---|---|---|
| 2,426,446 | 8/1947 | Funk | 72/DIG. 21 |
| 2,627,890 | 2/1953 | Lloyd et al. | 72/461 |
| 3,176,556 | 4/1965 | Roberts et al. | 83/71 |
| 3,187,613 | 6/1965 | Behling | 83/207 |
| 3,618,349 | 11/1971 | Roch | 72/36 |
| 3,691,887 | 9/1972 | Roch | 83/71 |
| 3,733,885 | 5/1973 | Brauer | 72/461 |

Primary Examiner—Charles W. Lanham
Assistant Examiner—M. J. Keenan
Attorney, Agent, or Firm—Woodard, Weikart, Emhardt & Naughton

[57] ABSTRACT

A power driven back gauge assembly on a press brake includes a housing with its front end affixed to the press brake bed and supported thereby. A carriage straddles the housing, supported by ball bushings on guide rods at each side of the housing, for linear movement toward and away from the press brake tooling. A penumatic cylinder inside the housing drives the carriage by means of a travel multiplying chain and sprocket system, and control is provided by a hydraulic cylinder secured to the pneumatic cylinder and having solenoid operated valves disposed inside the housing. A continuous back gauge bar is secured by adjustable connectors to supports mounted on the carriage.

21 Claims, 7 Drawing Figures

GAUGING APPARATUS FOR PRESSES AND THE LIKE

BACKGROUND OF THE INVENTION

1. Field of the Invention

This invention relates generally to gauging systems, and more particularly to gauge bar support and drive apparatus particularly useful as a back gauge for press brakes and the like.

2. Description of the Prior Art

In my U.S. Pat. No. 3,618,349 issued Nov. 9, 1971, there is disclosed a gauging system for presses, incorporating pre-programming of a sequence of gauge settings for bends in a product, by dialing-in a group of gauge settings to be employed. The implementation of this system involves a pair of power units for the front gauge, operating in a master-slave relationship, the power units being horizontally spaced and supporting suitable work support and locating means. Similarly, a pair of power units in master-slave relationship is employed for the back gauge. A later version employs a pair of piggy-back cylinders in each power unit, including a pneumatic cylinder and a hydraulic cylinder stacked together in each power unit. The system has been well received in industry. Nevertheless, it is customary to seek ways and means of cost reduction, and my present invention is the result of my efforts in that direction, particularly for a back gauge.

SUMMARY OF THE INVENTION

Described briefly, in a typical embodiment of the present invention, a frame having a front end securable to a press brake or other machine, has space therein for fluid drive means to drive a carriage mounted on the frame. The fluid drive means is preferably a combination of a pneumatic cylinder for power, and hydraulic cylinder for control, both being double acting and movable linearly on piston rods secured in the frame under tension. A travel multiplication means in the form of flexible strands and wheels, the former being connected to the frame and to the carriage, and the latter being mounted to the cylinders, provides for travel of the carriage throughout the full length of the frame, obtained by cylinder travel approximately half the distance and entirely within the frame. A gauge bar is mounted to the carriage through means enabling suitable horizontal and vertical adjustment manually.

DESCRIPTION OF THE PREFERRED EMBODIMENT

Figure 1:
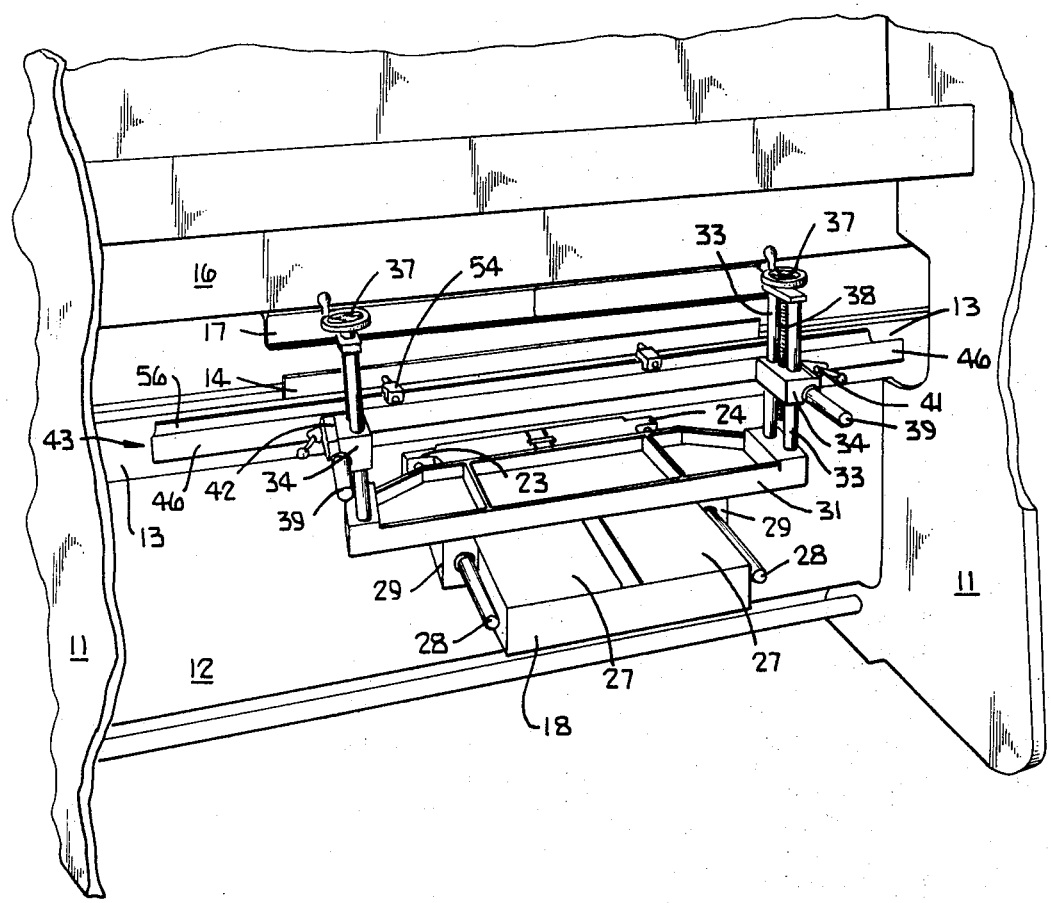
FIG. 1 is a perspective view of gauging apparatus according to a typical embodiment of the present invention employed on a press brake, the view being from the rear of the press brake.

Referring now to the drawings in detail, and more particularly to FIG. 1, there is shown a press brake having side frames 11 disposed on the floor and having the upright cross member 12 disposed between them and serving as a bed supporting the tool mounting rail 13 to which the lower forming tool 14 is affixed. A vertically movable ram 16 is provided and the upper forming tool 17 is affixed to the lower edge thereof. In conventional manner, the ram 16 is movable vertically for cooperation of the upper and lower forming tools of the tooling to make the appropriate bends in the material being formed.

Figure 2:
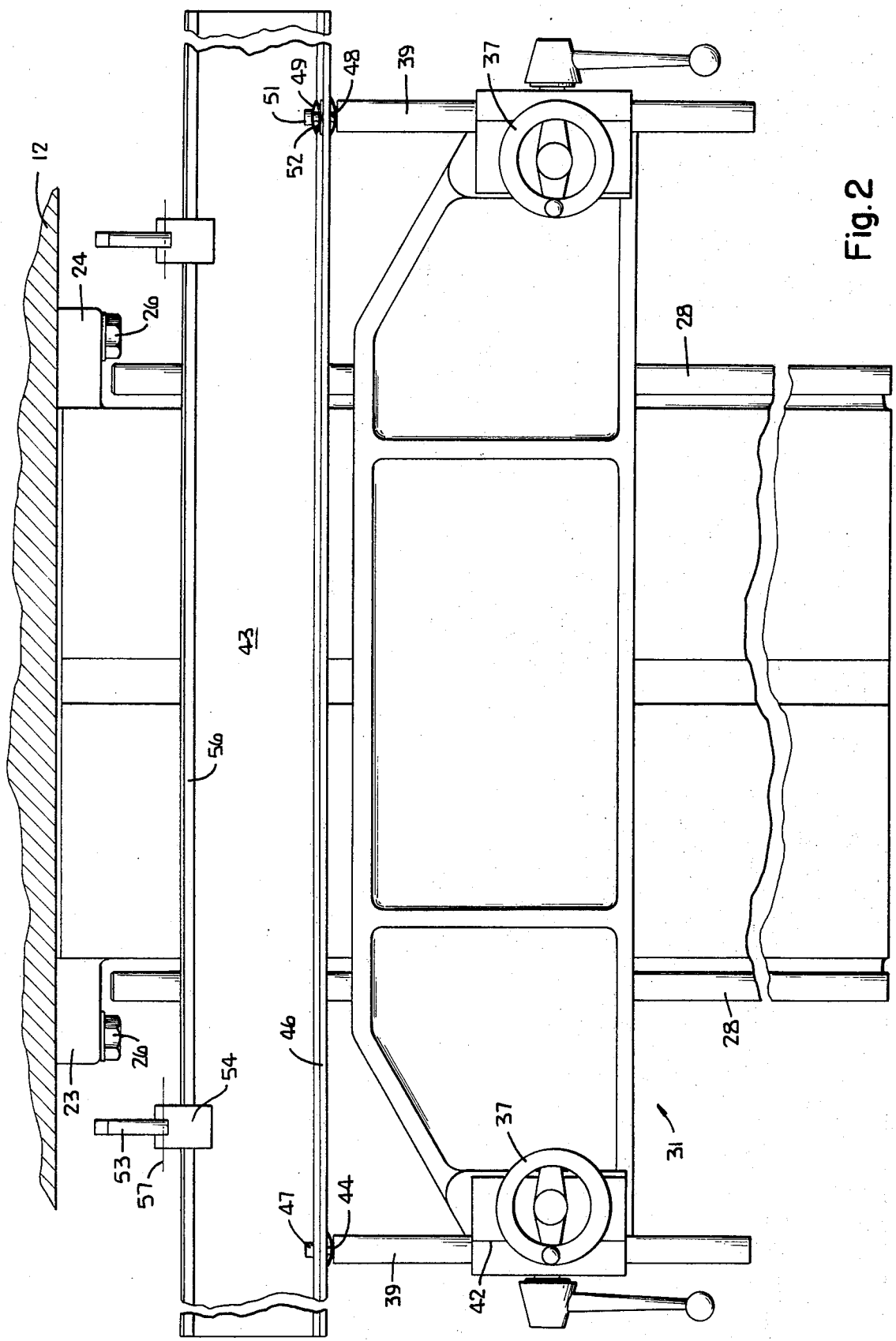
FIG. 2 is a top plan view of the back gauge assembly complete with a gauge bar and mounted to the base or bed of the press brake, a portion of the housing being broken out to conserve space in the drawing.
Figure 3:
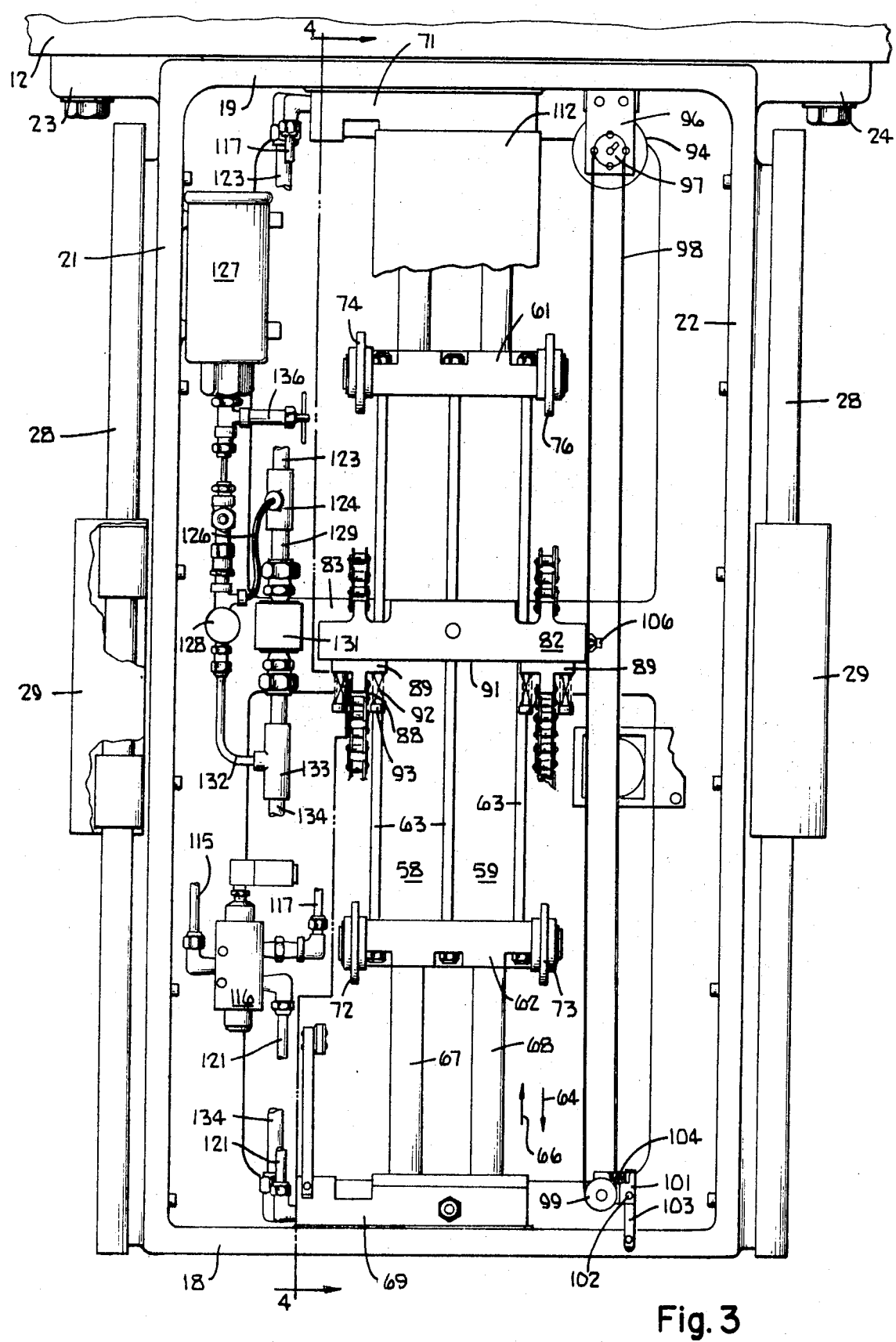
FIG. 3 is a top view of the gauge drive apparatus, with the cover removed to show the interior details.

The gauging apparatus according to the illustrated embodiment of the present invention includes a main casting in a frame-like configuration, having a rear end wall 18, front end wall 19, (FIG. 3) and side walls 21 and 22, with laterally extending mounting flanges 23 and 24 at the junctions of the front and side walls. The flanges 23 and 24 are affixed to the press brake bed 12 by means of bolts 26 as best shown in FIGS. 3 and 2. Top cover plates 27 are provided on the top of the frame to complete a sort of housing and exclude dirt from the interior thereof. These plates are omitted from the drawing in FIG. 3, to permit showing the interior details.

Figure 5:
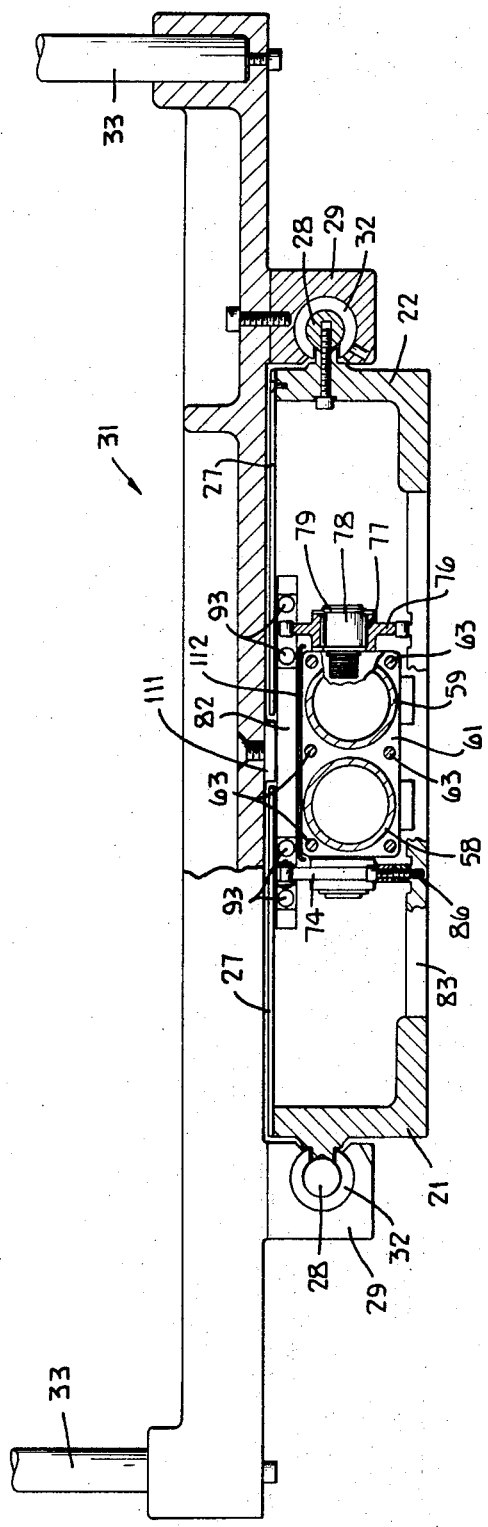
FIG. 5 is a section taken at line 5—5 in FIG. 4 and viewed in the direction of the arrows.

At each side of the frame there is affixed thereto a guide rod 28, and to each of these there is mounted a pair of ball bushings which are secured in a bearing block 29 at each side of the carriage 31. This carriage also is shown as a casting and extends over and straddles the housing provided by the combination of the main casting and the cover plates 27. The bearing blocks are affixed to the carriage by cap screws as best shown in FIG. 5, and the guide rods are likewise affixed to the housing side walls by cap screws. The ball bushings are represented in FIG. 5 at 32.

Figure 7:
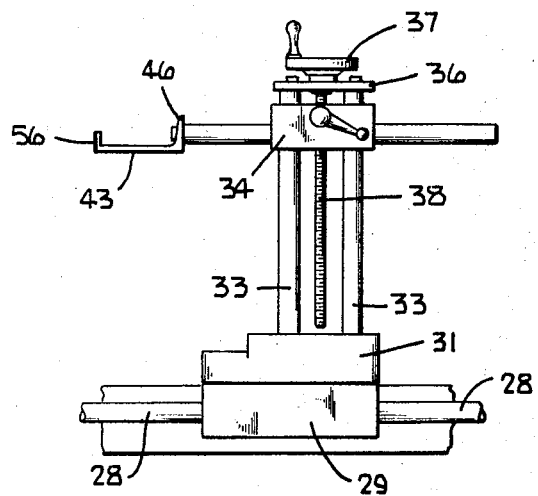
FIG. 7 is a side elevational view of the assembly on a somewhat smaller scale than in FIGS. 2 through 5.

As shown in FIG. 1, and better shown in FIG. 7, there are two pairs of support posts or rods 33 affixed to the carriage, one pair being disposed at each side thereof. There is a pair of gauge support arms 34. Each of these arms has a pair of bearings therein received on the support posts 33 and vertically slidable thereon. A cap 36 is affixed to the top of each pair of support posts 33 and supports a handwheel 37 which is fastened to an adjusting screw 38 which passes down through the cap and is threadedly received in the support arm 34. Therefore, by turning the handwheel, the support arm can be moved up and down on the support posts 33.

Each support arm has a gauge bar support rod 39 secured therein by an adjusting handle 41. The support arm is split longitudinally at 42 above the respective gauge bar support rod 39 whereby the adjusting handle 41 can tighten or loosen its grip on the gauge bar support rod.

A gauge bar 43 of the continuous type is affixed to the front end of the two gauge bar support arms. As best shown in FIG. 2, the connection at the left-hand side (as viewed in the drawing) involves a "Belville" type washer 44 between the rear upstanding flange 46 of the gauge bar and the front end of the support rod 39. This washer encircles the cap screw 47 threadedly received in the end of the support rod. At the right-hand side there is another Belville washer 48 behind flange 46, and two Belville washers 49 in front of the flange, all secured in place by the cap screw 51. This mounting provides a positive attachment and yet accommodates any slight cocking that there might be which might otherwise tend to cause some binding of the rods 39 in the clamps. Also, at the right hand side the screw 51 passes through a horizontally extending slot 52, rather than a circular aperture of the size of the screw. This accommodates the raising of one side by use of the handwheel 37 on that side independently of the other side in the event the height adjustment is not made by turning both handwheels simultaneously.

A gauge finger 53 is pivotally mounted to a pivot bracket 54 affixed to the front flange 56 of the gauge bar 43, this finger 53 being pivotable upwardly about an axis 57 in the pivot bracket. Another gauge finger is likewise mounted to the gauge bar.

Figure 4:
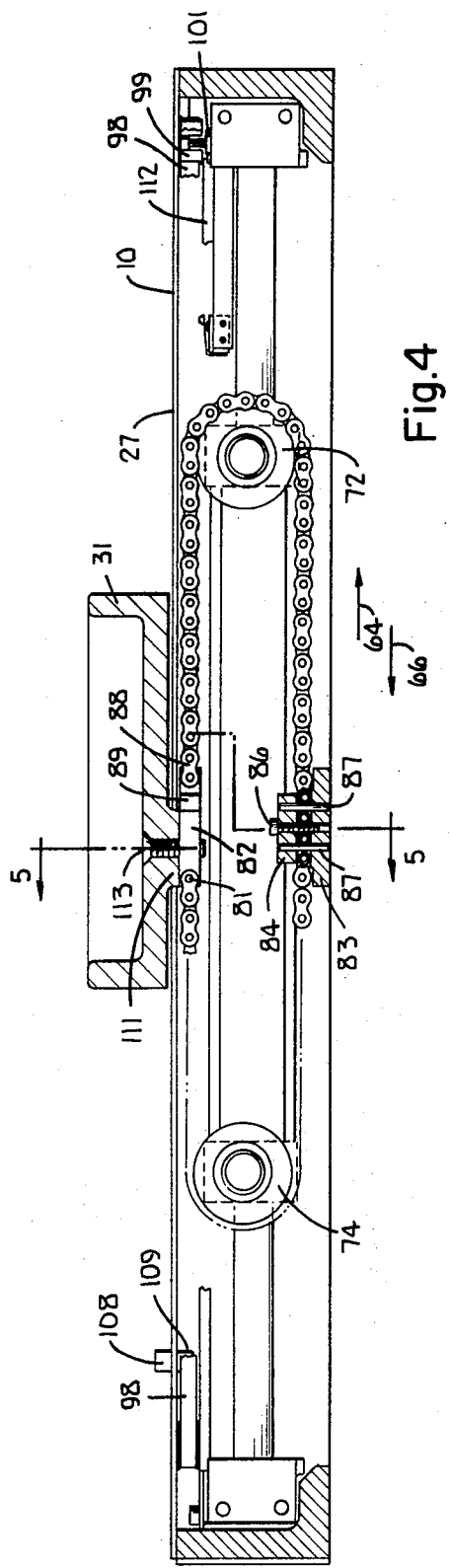
FIG. 4 is a section taken at line 4—4 in FIG. 3 and viewed in the direction of the arrows.

Referring now more specifically to FIGS. 3, 4 and 5, an air cylinder 58 and oil cylinder 59 are secured in side-by-side relationship and share the cylinder head blocks 61 and 62 at the front and rear ends thereof. These blocks are secured against the ends of the cylinders by the six tie rods 63 and nuts on the ends thereof. This cylinder assembly runs back and forth in the direction of arrows 64 and 66, on the piston rods 67 and 68. The opposite ends of these rods are affixed to the rear cylinder manifold block 69 and front cylinder manifold block 71 which are affixed by suitable screws to the rear wall 18 and front wall 19 of the frame. There is approximately 0.004 inch clearance between each manifold block and the mounting boss therefor in the frame. Therefore, when the manifold blocks are tightened onto the bosses, the cylinder rods are placed in tension, contributing to maintenance of their straightness and minimizing wear on cylinder seals running thereon.

Four wheels 72, 73, 74 and 76 (FIG. 3) are mounted to the drive cylinder assembly, two of them to each of the cylinder head blocks. In FIG. 5, where a portion of the cylinder head block 61 is broken away, it is shown that wheel 76 is mounted by means of roller bearings 77 to a shaft 78 threadedly received in and thereby secured to the cylinder head block 61. The wheel is retained on the shaft 78 by means of a retaining ring 79. The other four wheels are mounted in the same way.

A length of roller chain extends around wheels 72 and 74, and one end thereof is pinned at 81 to a carriage mounting block 82. The chain is clamped to the lower intermediate cross member 83 of the main casting by means of a chain clamp 84 secured to the casting by two or more screws 86. Pin 87 received between successive rollers in the chain prevent movement thereof longitudinally. The other end of the chain is fastened by means of a conventional connecting link and spring clip at 88 to the chain anchor block 89 which is urged against the rear face 91 of carriage mounting block 82 by a pair of springs 92, each of which is received around the shank of a chain anchoring cap screw 93 threadedly received in the carriage mounting block 82. The cap screws 93 extend freely through apertures in the chain anchor blocks 89. Another roller chain is secured to the main casting cross member 83 and passes around the wheels 73 and 76 and is secured to the carriage mounting block 82 in the same manner. This arrangement serves to multiply the motion of the cylinders as transmitted to the carriage, so that the carriage is driven at twice the rate of movement of the cylinders.

In order to transmit to the control apparatus, signals indicative of the movement of the carriage, an "encoder" in the form of an electric pulse generator 94 is secured to the encoder mounting bracket 96 and has a drive pulley 97 on the input shaft thereof. A metal tape 98 passes around pulley 97 and extends to the rear of the frame where it passes around a tape idler pulley 99 mounted to an idler pulley bracket 101 which is mounted by means of a pivot pin 102 to the idler bracket mount 103, which is affixed to the rear cross member 18 of the frame. An idler tension spring 104, which is a coiled compression spring, urges the idler in the direction of arrow 64 to maintain tension on the tape, this spring engaging both the mount 103 and the bracket 101 and tending to move the bracket 101 and thereby the idler pulley counterclockwise about the pivot pin 102. One point on the tape is affixed to the carriage mounting block 82 by the tape clamp 106 secured thereto by a cap screw.

A carriage safety stop is provided by means of a pair of bars 108 and 109 secured together by means of screws clamping the bars against the top covers 27 on opposite sides of the slot between the covers (FIG. 4). This stop is not needed or used in the normal operation of the apparatus. The boss 111 at the bottom center of the carriage moves in the slot between covers 27 as the carriage moves forward and backward in the direction of arrow 66 and 64, respectively. Below the carriage mounting block 82, and immediately above the cylinders, and extending from the rear manifold block 69 to the front manifold block 71 there is a cylinder cover plate 112, best shown in FIGS. 4 and 5.

It can be seen that the boss 111, which is generally circular, has a lower face engaging the upper face of the carriage mounting block 82, and the carriage is secured thereto by means of a cap screw 113. The fact that this single centrally located screw provides the connection between the carriage mounting block and carriage serves to provide positive drive of the carriage by the mounting block, but will accommodate some skew between the carriage and carriage mounting block.

Figure 6:
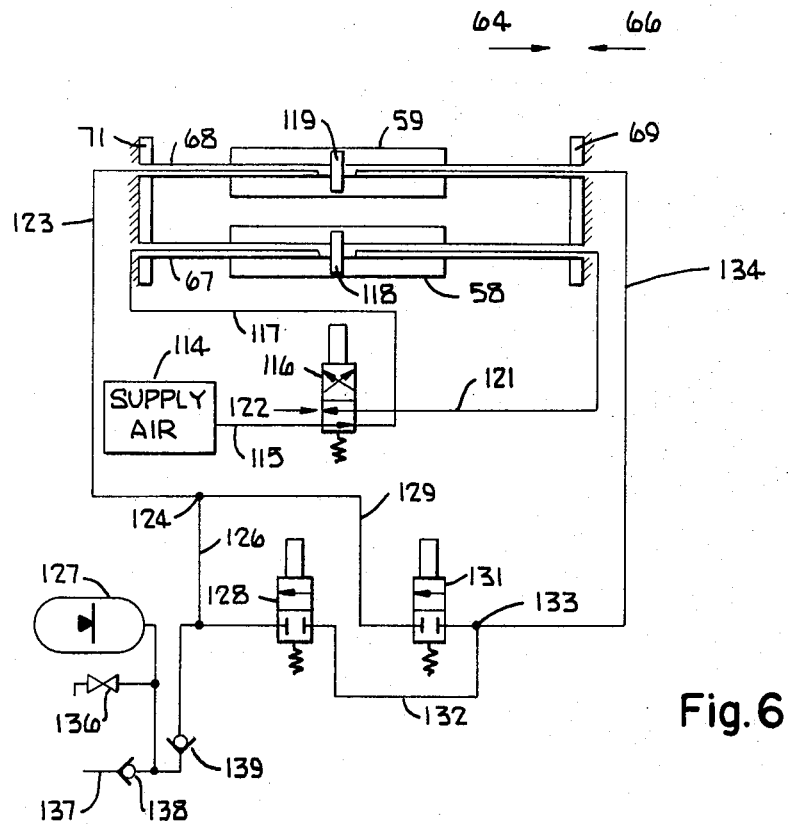
FIG. 6 is a schematic diagram of the fluid drive circuit.

Although the pneumatic and hydraulic connections are shown to some extent in FIG. 3, an understanding of the connections may be better appreciated upon reference to FIG. 6, wherein parts to which reference has already been made in the above description, bear the same reference numerals. A source of compressed air is indicated at 114, normally applying air on line 115 through the air control solenoid valve 116 and line 117, through the manifold 71 and piston rod 67 to the front chamber of air cylinder 58 immediately in front of the piston 118. The rear end of the cylinder is vented through the bore in the piston rod 67, manifold 69, line 121 and valve 116 to atmosphere at 122.

There is a piston 119 in the hydraulic cylinder 59 and, similar to the air cylinder, the piston rod 68 is ported in front of the piston and connected through manifold 71 to a line 123 which branches at 124 into line 126 connected to an accumulator 127 and to the solenoid valve 128. The other branch from junction 124 is through line 129 to solenoid valve 131. Both of these valves are normally closed, and valve 128 is connected through line 132 to the junction 133 which is connected to valve 131 and through line 134 and manifold 69 and passageway in piston rod 68 to an outlet port immediately behind the piston 119 to the oil cylinder 59. A manually operated venting valve is provided at 136, a fluid fill terminal at 137 with associated check valve 138, and a check valve 139 is provided between the accumulator and control valves.

OPERATION

The overall operation of the apparatus is similar to that described in my above mentioned patent. On a press brake, a line of reference may be the line at which the upper and lower forming tools of the press brake meet. The front face of the front flange 56 of the gauge bar, or the front ends of the gauge fingers, depending upon whether the gauge bar face or the fingers are going to be used to contact the edge of the material to be formed, must be located at the appropriate distance from this reference line for each successive bend. Forward drive of the cylinders, and thereby of the gauge bar, is accomplished with the air valve 116 in the position shown. This drive is terminated by closure of the solenoid operated hydraulic valves 128 and 131, both of which are normally closed to hold the position of the gauge constant. If the gauge is to be moved further forward, one or both of the solenoid valves 128 and 131 is opened, and to slow the rate of gauge travel, one of these is closed while the other remains opened. The one is then closed when travel is to stop. To reverse the motion, the air valve 116 is shifted, and one or both hydraulic valves are again opened. They are then closed in sequence to slow and terminate the travel respectively.

It will be noted that one end of the drive chain is connected directly to the front of carriage mounting block 82. The other end is connected to the spring loaded anchor block 89 at the rear of block 82. The direct or "hard" connection of the drive chain to the front side of the carriage mounting block 82 provides a slack-free solid connection, so that when the hydraulic valves close, the stock being pushed against the gauge or finger faces in the direction of arrow 64 is met by a solid stop at the correct gauging distance. It may be noted here that the direct connection of the hydraulic valves to the hydraulic cylinder is from the junction 133 through line 134 to the rear chamber in the cylinder, to provide a hard and precise stop against forward motion of the gauge carriage when the valves are closed. By using the spring loaded chain anchor block on the other end of the chain, and the accumulator on the other side of the hydraulic cylinder, any possible resilience or slack in the chain or hydraulic system exists in the termination of rearward movement of the gauge carriage, where the flow of hydraulic fluid is from the cylinder 59 into the accumulator side of the valves 128 and 131.

Movement of the carriage is indicated by the pulse output from the pulse generator 94 as the moving cylinder assembly moves the tape 98 around pulleys 97 and 99. The tape can be perforated tape, mating with projections on the encoder drive pulley, but other means might also be used for transmitting a signal representative of the movement of the carriage. Also it should be noted that, while flexible strands in the form of roller chains are employed around wheels for transmitting the cylinder motion to the carriage, it is possible that cables and smooth pulleys might also be employed.

The compact low profile obtained by the construction according to the present invention, adapts the apparatus to a variety of machines. The outboard mounting of carriage guides, provides substantial rigidity of the gauge bar mounting, yet conserves the overall horizontal space requirement of the mount to the machine. The construction adapted to effective use of castings, and lends itself to low cost. The use of the pack of two cylinders, one for drive and one for control, secured together side-by-side, contributes to the low profile and reduced cost. While the unit will be built in two lengths for either a 12 inch total carriage travel, or 24 inch travel, it is well adapted to construction in other sizes.

While the invention has been disclosed and described in some detail in the drawings and foregoing description, they are to be considered as illustrative and not restrictive in character, as other modifications may readily suggest themselves to persons skilled in this art and within the broad scope of the invention.

The invention claimed is:

1. In a machine having tools therein and a reference line associated with said tools, gauging apparatus comprising:
a first mounting means secured to the machine;
first and second parallel horizontally spaced guideways mounted to said mounting means and extending perpendicular to a plane containing said reference line;
a first drive cylinder means parallel to and disposed between said guideways, and having a cylinder member between said guideways and a piston rod member, one of said members being affixed to said mounting means, said guideways extending beyond both ends of said cylinder-member;
guage carriage means mounted to said guideways and movable thereon toward and away from said reference line and beyond both ends of said cylinder member. said carriage means being coupled to said cylinder means and drivable thereby.

2. The combination of claim 1 and further comprising:
a first drive wheel coupled to said cylinder means;
a first connector strand connected to said mounting means and extending forward therefrom toward said reference line and then passing around said first wheel and extending backward therefrom to a connection to said carriage means whereby said drive cylinder means drives said carriage means forward toward said reference line as one of said members of said drive cylinder means moves said wheel toward said reference line.

3. The combination of claim 2 wherein:
said mounting means include a frame having a front end affixed to said machine, said guideways being horizontally spaced and affixed to sides of said frame.

4. In a machine having tools therein and a reference line associated with said tools, gauging apparatus comprising:
a first mounting means secured to the machine;
first and second parallel spaced guideways mounted to said mounting means and extending perpendicular to a plane containing said reference line;
a first drive cylinder means parallel to and disposed between said guideways, and having a cylinder member and a piston rod member, one of said members being affixed to said mounting means;

gauge carriage means mounted to said guideways and movable thereon toward and away from said reference line, said carriage means being coupled to said cylinder means and drivable thereby;

a first drive wheel coupled to said cylinder means;

a first connector strand connected to said mounting means and extending forward therefrom toward said reference line and then passing around said first wheel and extending backward therefrom to a connection to said carriage means whereby said drive cylinder means drives said carriage means forward toward said reference line as one of said members of said drive cylinder means moves said wheel toward said reference line;

said mounting means including a frame having a front end affixed to said machine, and said guideways being horizontally spaced and affixed to sides of said frame;

said carriage means including a carriage mounting block to which said first connector strand is attached, and a carriage connected to said block, the connection of said carriage to said block accommodating misalignment therebetween.

5. In a machine having tools therein and a reference line associated with said tools, gauging apparatus comprising:

a first mounting means secured to the machine;

first and second parallel spaced guideways mounted to said mounting means and extending perpendicular to a plane containing said reference line;

a first drive cylinder means parallel to and disposed between said guideways, and having a cylinder member and a piston rod member, one of said members being affixed to said mounting means;

carriage means mounted to said guideways and movable thereon toward and away from said reference line, said carriage means being coupled to said cylinder means and drivable thereby;

said carriage means including a carriage straddling said frame, the combination further comprising:

two pairs of upstanding support guides, one pair at each side of said carriage;

a pair of gauge support arms, one arm being slidingly received on one of said pairs of support guides; and the other arm slidingly received on the other of said pairs of support guides;

height adjusting means including a pair of adjusting handwheels and screws operated thereby, said screws being supported on caps supported by said pairs of guides, and threadedly received in said gauge support arms, said arms being vertically adjustable by rotation of said handwheels; and gauge support rods mounted to said arms and projecting forwardly therefrom and having gauge means thereon in front of said support arms.

6. The combination of claim 5 wherein said gauge means include:

a horizontally extending gauge bar having a rear vertical flange facing front ends of said gauge support rods, a first screw passing through an aperture in said flange and threadedly received in the front end of one of said support rods, a spring washer being disposed around said screw between said flange and said rod front end, said screw securing said bar to said one rod against the spring load of said washer, and a second screw passing through a second aperture in said flange and threadedly received in the front end of the other of said support rods, a pair of spring washers being disposed between the head of said second screw, and said flange, and another spring washer disposed between said flange and said front end of said other support rod, one of said apertures being sufficiently large in a horizontal direction, to accommodate some limited horizontal movement therein of the screw passing therethrough.

7. The combination of claim 1 wherein:

said first mounting means include a frame having a front end affixed to said machine, and having horizontally spaced sides;

said guideways being disposed on the exterior of said frame sides, outboard thereof;

said cylinder member being disposed inside said frame.

8. In a machine having tools therein and a reference line associated with said tools, gauging apparatus comprising:

a first mounting means secured to the machine;

first and second parallel spaced guideways mounted to said mounting means and extending perpendicular to a plane containing said reference line;

a first drive cylinder means parallel to and disposed between said guideways, and having a cylinder member and a piston rod member, one of said members being affixed to said mounting means;

guage carriage means mounted to said guideways and movable thereon toward and away from said reference line, said carriage means being coupled to said cylinder means and drivable thereby;

said first mounting means including a frame having a front end affixed to said machine, and having horizontally spaced sides;

said guideways being disposed on the exterior of said frame sides, outboard thereof;

said cylinder member being disposed inside said frame; and first selectively operable valve means inside said frame and having an input coupled to a source of fluid energy and having a first output coupled to one side of a piston in said cylinder member, and having a second output coupled to the other side of said piston in said cylinder member, said first valve means being shiftable to drive one of said members in said cylinder means in opposite directions.

9. The combination of claim 8 and further comprising:

second cylinder means inside said frame and connected to said first cylinder means and having a second cylinder member and a second piston rod member, one of said second member being affixed to said frame;

a hydraulic fluid path from one side of a piston in said second cylinder member to the other side of said piston;

second selectively operable valve means inside said frame and in said path to preclude passage of fluid therethrough and thereby prevent movement of said first and second cylinder means; said second valve means being operable, when actuated, to open said path and permit movement of said first and second cylinder means.

10. The combination of claim 9 and further comprising:

third selectively operable valve means inside said frame and in parallel with said second valve means and normally precluding passage of fluid therethrough, said third valve means being operable when activated to open said path and permit movement of said first and second cylinder means with respect to said pistons.

11. The combination of claim 7 wherein:

said carriage means include a carriage having a pair of horizontally spaced bearing blocks thereon with linear bearings therein received on said guideways, whereby said carriage straddles said frame.

12. The combination of claim 11 and further comprising:

second cylinder means inside said frame and connected to said first cylinder means and having a second cylinder member and second piston rod member, the cylinder members of both of said cylinder means being affixed to said frame, said carriage means being coupled through a carriage mounting block and travel multiplying means to said cylinder members.

13. The combination of claim 12 wherein:

said travel multiplying means include a pulley wheel on said cylinder members with its rotational axis perpendicular to the direction of travel of said cylinder members, and a flexible non-stretchable strand secured at one point to said frame, and extending parallel to said direction of travel and then around said wheel and back to a connection to said carriage mounting block.

14. The combination of claim 13 wherein:

said carriage mounting block is inside said frame and is connected to said carriage by a fastening means centrally located between said guideways.

15. Gauging apparatus for a press or the like comprising:

mounting means having a mounting portion securable to a press;

first and second parallel horizontally spaced guideways secured to said mounting means;

guage carriage means mounted on said guideways and linearly movable therein from one end of said guideways to the other end of said guideways;

first and second cylinder means between said guideways, each including a cylinder member and a piston rod member, both of said guideways extending beyond both ends of said cylinder members, one of said members of each of said cylinder means being affixed to said mounting means and the other of said members of each of said cylinder means being coupled to said carriage means, one of said cylinder members having liquid therein; and means for controlling passage of liquid to and from said one of said cylinder members to control linear movement of said cylinder means.

16. The combination of claim 15 wherein:

said mounting means has horizontally spaced sides;

said guideways being disposed at the exterior of said sides, outboard thereof.

17. The combination of claim 15 wherein:

said carriage means includes a carriage which extends across said mounting means, the combination further comprising:

horizontally spaced, vertically extending support guides mounted to said carriage near opposite ends of said carriage, gauge support arms mounted to said guides.

18. The combination of claim 17 and further comprising:

gauge support rods mounted in said arms and projecting therefrom parallel to said guideways;

a gauge bar extending horizontally perpendicular to said support rods and affixed thereto.

19. The combination of claim 15 wherein:

said one of said cylinder members has the piston rod member thereof projecting from piston means therein through opposite ends of said one cylinder member;

a liquid path communicates between the chambers on opposite sides of said piston means in said one cylinder member; and said controlling means include a liquid control valve in said path.

20. The combination of claim 15 wherein:

said cylinder members are in side-by-side relationship and affixed together.

21. The combination of claim 15 wherein:

said mounting means is a rigid frame, having front and rear cross members held in horizontally spaced relation by said members;

said piston rod members being mounted in tension between said front and rear cross members.

* * * * *